US008561379B2

(12) United States Patent
Breck

(10) Patent No.: US 8,561,379 B2
(45) Date of Patent: Oct. 22, 2013

(54) PROCESS FOR MAKING POUCHES FROM FLEX-CRACK-RESISTANT, LDPE FILMS

(75) Inventor: Alan Keith Breck, Kingston (CA)

(73) Assignee: Liqui-Box Corporation, Worthington, OH (US)

(*) Notice: Subject to any disclaimer, the term of this patent is extended or adjusted under 35 U.S.C. 154(b) by 0 days.

(21) Appl. No.: 13/558,619

(22) Filed: Jul. 26, 2012

(65) Prior Publication Data
US 2013/0125513 A1 May 23, 2013

Related U.S. Application Data

(63) Continuation of application No. 11/789,970, filed on Apr. 26, 2007, now Pat. No. 8,252,397.

(60) Provisional application No. 60/795,095, filed on Apr. 26, 2006.

(51) Int. Cl.
B65B 9/08 (2012.01)

(52) U.S. Cl.
USPC ............. 53/450; 428/515; 428/516; 525/191; 525/240

(58) Field of Classification Search
None
See application file for complete search history.

(56) References Cited

U.S. PATENT DOCUMENTS 4,503,102 A 3/1985 Mollison
4,521,437 A 6/1985 Storms (Continued)

FOREIGN PATENT DOCUMENTS

CA 2113455 2/1993
CA 2165340 1/1995

(Continued)

OTHER PUBLICATIONS

F.C. Lewis, "Form-Fill Seal," Packaging Encyclopedia, p. 180, 1980.

(Continued)

Primary Examiner — Callie Shosho
Assistant Examiner — Ronak Patel
(74) Attorney, Agent, or Firm — Potter Anderson Corroon LLP; Rakesh H. Mehta, Esq.

(57) ABSTRACT

A sealant film for use in a film structure for the manufacture of pouches and bags for containing flowable materials, the sealant film comprising: (1) from about 2.0 to about 9.5 wt %, based on 100 wt % total composition, of an ethylene $C_4$-$C_{10}$-alpha-olefin interpolymer having a density of from 0.850 to 0.890 g/cc and a melt index of 0.3 to 5 g/10 min, the interpolymer being present in an amount that optimizes flex crack resistance as measured using a Gelbo Flex tester set up to test in accordance with ASTM F392, and minimizes reduction of thermal resistance, as measured using DSC (ASTM E794/E793) Differential Scanning Calorimetry (DSC) which determines temperature and heat flow associated with material transitions as a function of time and temperature, and stiffness of the sealant film layer as measured using Tensile Modulus of the polyethylene films measured in accordance with ASTM Method D882; (2) from about 70.5 wt % to about 98.0 wt %, based on 100 wt % total composition, of one or more polymers selected from ethylene homopolymers and ethylene $C_4$-$C_{10}$-alpha-olefin interpolymers, having a density between 0.915 g/cc and 0.935 g/cc and a melt index of 0.2 to 2 g/10 min; and (3) from about 0 wt % to about 20.0 wt %, based on 100 wt % total composition, of processing additives selected from slip agents, antiblock agents, colorants and processing aids; and wherein the sealant film has a thickness of from about 2 to about 60 μm.

16 Claims, 11 Drawing Sheets

(56) References Cited

U.S. PATENT DOCUMENTS

| | | | |
|---|---|---|---|
| 5,206,075 A | 4/1993 | Hodgson, Jr. |
| 5,288,531 A | 2/1994 | Falla et al. |
| 5,292,392 A | 3/1994 | Miller et al. |
| 5,360,648 A | 11/1994 | Falla et al. |
| 5,364,486 A | 11/1994 | Falla et al. |
| 5,508,051 A | 4/1996 | Falla et al. |
| 5,721,025 A | 2/1998 | Falla et al. |
| 5,879,768 A | 3/1999 | Falla et al. |
| 5,942,579 A | 8/1999 | Falla et al. |
| 5,972,443 A | 10/1999 | Breck et al. |
| 6,086,967 A | 7/2000 | Whiteman et al. |
| 6,117,465 A | 9/2000 | Falla |
| 6,237,308 B1 | 5/2001 | Quintin et al. |
| 6,256,966 B1 | 7/2001 | Braun et al. |
| 6,406,765 B1 | 6/2002 | Braun et al. |
| 6,416,833 B1 | 7/2002 | Climenhage et al. |
| 6,525,138 B2 | 2/2003 | Johoji et al. |
| 6,631,605 B1 | 10/2003 | Quintin et al. |
| 6,767,599 B2 | 7/2004 | Braun et al. |
| 6,795,053 B1 | 9/2004 | Funamoto et al. |
| 8,252,397 B2 | 8/2012 | Breck |
| 2004/0146730 A1 | 7/2004 | Holzer et al. |
| 2005/0131160 A1 | 6/2005 | Shimizu et al. |
| 2007/0252276 A1 | 11/2007 | Lloyd-George |
| 2007/0254119 A1 | 11/2007 | Lloyd-George |
| 2007/0269623 A1 | 11/2007 | Breck |

FOREIGN PATENT DOCUMENTS

| | | |
|---|---|---|
| CA | 2151589 | 4/1995 |
| CA | 2182524 | 8/1995 |
| CA | 2190004 | 11/1995 |
| CA | 2205172 | 3/1997 |
| CA | 2231449 | 4/1997 |
| CA | 2239579 | 6/1997 |
| CA | 2280910 | 8/1998 |
| CA | 2411183 | 5/2004 |
| CA | 2526873 | 12/2004 |
| EP | 0351744 A | 1/1990 |
| EP | 1059326 A | 12/2000 |
| WO | WO95/26268 | 10/1995 |
| WO | WO97/20693 A | 6/1997 |

OTHER PUBLICATIONS

International Search Report for PCT/CA2007/000717, dated Jul. 24, 2007.

Supplementary European Search Report for EP07719643, dated Jun. 10, 2009.

Figure 3: Loss of Stiffness as a Function of ULDPE Concentration

Figure 5: DSC Melting Curve for Control Film 1

Figure 6: DSC Melting Curve for Example Film 1.9A

Figure 8: DSC Melting Curve for Counter Example Film 1.30C

Figure 9: Flex Crack Improvement for Low Density Polyethylene Films versus Medium to High Density Films

PROCESS FOR MAKING POUCHES FROM FLEX-CRACK-RESISTANT, LDPE FILMS

CROSS-REFERENCE TO RELATED APPLICATION

This application is filed under the provisions of 37 C.F.R. §1.53(b) and claims priority under 35 U.S.C. §120 to U. S. patent application Ser. No. 11/789,970, filed on Apr. 26, 2007 now U.S. Pat. No. 8,252,397, which in turn claims priority to the U.S. Provisional Patent Application No. 60/795,095, filed on Apr. 26, 2006. Both applications are incorporated herein in entirety.

FIELD OF THE INVENTION

This invention relates to film used to manufacture pouches and bags for containing flowable material. The film is made of low density polyethylene and can be formed into a monofilm or a multi-layer film that can be used to produce packages that exhibit improved flex crack resistance.

BACKGROUND OF THE INVENTION

Flex crack resistance is an extremely important property for film used in bags and pouches that are formed into packages for flowable materials, particularly for liquids, and most particularly for non-viscous liquids like water, milk, juices, and the like. These liquids can slosh around considerably during package manufacturing, handling and transportation causing flexing of the film and flex cracking for most of the commonly used film materials.

Flex cracking is caused by the movement of the liquid within the pouch or bag, and is most likely to happen where the film is in close proximity to the upper surface of the liquid. Flex cracking can occur during shipping and handling of even the smallest fluid-containing pouches. Flex crack pinholes result in at least loss of oxygen and moisture barrier, reducing the shelf life potential of the product, and often in loss of the hermetic seal, rendering the product unsafe to use if it is a food product. Generally a Flex Crack Resistant Film is one that should develop 10 or less pinholes per 300 $cm^2$ in 20,000 cycles of Gelbo Flex testing, and preferably 5 or less pinholes per 300 $cm^2$ in 20,000 cycles.

It is well known that film made from a lower density polyethylene will have better flex crack resistance than film made from a higher density polyethylene. In this regard, reference may be had to the disclosures of WO 95/26268. It is also well known that film made from a lower density polyethylene will have inferior thermal resistance and stiffness than film made from a higher density polyethylene. Reference in this instance may be had to the disclosures of US 2005/0131160 published Jun. 16, 2005, the disclosure of which are incorporated herein by reference. However, what is not well understood is how to modify the composition of a polyethylene film to maximize the improvement in flex crack pinhole resistance, while at the same time minimizing the negative effect on thermal resistance and stiffness, which are generally desirable film properties.

Film with inadequate thermal resistance may stretch and deform unacceptably in close proximity to heated machine parts such as sealing jaws found in form, fill and seal machines. The stretched or deformed area of the film may become the weak point of the pouch or bag, at which it will fail prematurely in subsequent shipping and handling. Aqueous products are a major portion of those products packaged in pouches and bags. As water boils at 100° C., thermal stability at temperatures just above 100° C. is therefore desirable in a pouch or bag film.

Bending stiffness may, or may not, be important to the performance of the pouch or bag, depending on the end use. Pouches, which are to stand up in a pitcher and pour without flopping over to restrict fluid flow, need a minimum level of bending stiffness. Film also requires a certain amount of bending stiffness to run through form-fill-seal equipment effectively, without conforming too closely around forming collars, stationary guides and rollers so that it stretches and distorts. Bending stiffness depends on the thickness of the film and its tensile modulus. As economics drive industry to downgauge films further and further, tensile modulus becomes more and more important in achieving adequate bending stiffness. The minimum tensile modulus for a thin pouch or bag film that is used on form-fill-seal equipment should be 20,000 psi, and 25,000 psi may also be used.

SUMMARY OF THE INVENTION

Surprisingly, it has been found that blending ultra low density polyethylene (ULDPE) as a very minor component in a variety of low density ethylene homopolymers and interpolymers, leads to a film with particularly good flex crack performance. This desirable effect is achieved with very little negative impact on the thermal resistance and stiffness of the film.

There are many disclosures of combinations of ultra low density polyethylene polymers (ULDPE) with linear low density polyethylene polymers. An example can be found in U.S. Pat. No. 5,508,051 which discloses such a combination. However, the combination proposed requires at least 10% by weight of the ULDPE component and further, does not address the problem of flex cracking.

The prior art provides little direction on how to control or eliminate flex crack in films used for packaging of flowable materials, in particular liquids. The present invention while utilizing a known combination of polymers now provides specific direction on how they should be combined to deal with flex cracking in the resultant films. Further it is surprising that this combination offers the right balance of properties with respect to flex cracking, thermal resistance and stiffness that not only allows its use in the making of pouches and bags for containing flowable materials, but also permits the film to be downgauged in thickness. Thus the film possesses a desirable resistance to flex cracking, good performance in typical pouch and bag requirements and a commercial cost advantage because of the downgauging capability. The film of the invention may be used on its own as a monofilm or may be incorporated into a multi-layer structure or into a multi-ply film structure, where its flex crack resistance provides the whole film with this property at a suitable level.

In one aspect of the invention there is provided a sealant film for use in a film structure for the manufacture of pouches and bags, for containing flowable materials, the sealant film comprising 1) from about 2.0 to about 9.5 wt %, based on 100 wt % total composition, of an ethylene $C_4$-$C_{10}$-alpha-olefin interpolymer having a density of from 0.850 to 0.890 g/cc and a melt index of 0.3 to 5 g/10 min, the interpolymer being present in an amount that optimizes flex crack resistance as measured using a Gelbo Flex tester set up to test in accordance with ASTM F392, and minimizes reduction of thermal resistance, as measured using DSC (ASTM E794/E793) Differential Scanning Calorimetry (DSC) which determines temperature and heat flow associated with material transitions as a function of time and temperature, and stiffness of the sealant film layer as measured using Tensile Modulus of the polyethylene films measured in accordance with ASTM Method D882; 2) from about 70.5 wt % to about 98.0 wt %, based on 100 wt % total composition, of one or more polymers selected from ethylene homopolymers and ethylene $C_4$-$C_{10}$-alpha-olefin interpolymers, having a density between 0.915 g/cc and 0.935 g/cc and a melt index of 0.2 to 2 g/10 min; 3) from about 0 wt % to about 20.0 wt %, based on 100 wt % total composition, of processing additives selected from slip agents, antiblock agents, colorants and processing aids; and the sealant film has a thickness of from about 5 to about 60 μm.

Flex Crack Resistance is assessed by means of the Gelbo Flex Tester referenced above. Optimization means that pin holes are 10 or less per 300 $C_2$ in 20,000 cycles of Gelbo Flex testing. Pin holes of 5 or less are more optimal. As for minimizing reduction of thermal resistance, ideally this resistance is at temperatures that are as close as possible to 100° C. The Examples provide guidance with regard to the limits here. These two parameters require balancing to achieve the desired result. The person skilled in the art can readily ascertain from the test results as set out where the balance lies for a particular film.

More particularly, the present invention provides a sealant film for use in a film structure for containing flowable materials, the sealant film comprising 1) from about 2.0 to about 9.5 wt %, based on 100 wt % total composition, of an ethylene $C_4$-$C_{10}$-alpha-olefin interpolymer having a density of from 0.850 to 0.890 g/cc and a melt index of 0.3 to 5 g/10 min, the interpolymer being present in an amount such that the film structure develops 10 or less pinholes per 300 cm$^2$ in 20,000 cycles of Gelbo Flex testing, as measured using a Gelbo Flex tester set up to test in accordance with ASTM F392, and has a thermal resistance at temperatures just above 100° C., as measured using DSC (ASTM E794/E793) Differential Scanning Calorimetry (DSC) which determines temperature and heat flow associated with material transitions as a function of time and temperature, and a minimum tensile modulus of 20,000 psi as measured using Tensile Modulus of the polyethylene films measured in accordance with ASTM Method D882; 2) from about 70.5 wt % to about 98.0 wt %, based on 100 wt % total composition, of one or more polymers selected from ethylene homopolymers and ethylene $C_4$-$C_{10}$-alpha-olefin interpolymers, having a density between 0.915 g/cc and 0.935 g/cc and a melt index of 0.2 to 2 g/10 min; 3) from about 0 wt % to about 20.0 wt %, based on 100 wt % total composition, of processing additives selected from slip agents, antiblock agents, colorants and processing aids; and the sealant film has a thickness of from about 5 to about 60 μm.

In another form of the invention, the sealant film has a minimum tensile modulus of 20,000 psi.

In another aspect of the invention, there is provided a multi-layer film for use in making pouches for packaging flowable material having improved flex crack resistance wherein the sealant layer is as described above and has a thickness of from about 2 to about 50 μm.

In yet another aspect of the invention there is provided a multi-layer film for use in making pouches having improved flex crack resistance wherein one or both of the outer layers is the monofilm as described above.

In a further aspect there is provided a multi-ply film structure for use in making bags having improved flex crack resistance for packaging flowable material, which has an intermediate or inner ply of the monofilm as described above having a thickness of from about 20 to about 125 μm.

The ethylene $C_4$-$C_{10}$-alpha-olefin interpolymers 1) and 2) may each be octene interpolymers. Component 3) may comprise from about 3 to about 5 wt % based on 100 wt % total composition.

In another aspect of this invention there is provided an improved pouch making process comprising the steps of forming a film structure as described above; forming the film structure into a tubular member; heat sealing longitudinal edges and then filling the pouch with flowable material; heat sealing a first transverse end of the tubular member to form a pouch; and sealing and cutting through a second transverse end of the tubular member to provide a filled pouch. The tubular member may be filled continuously or intermittently as desired. The upper transverse seal is the bottom seal of the next pouch to be formed and filled. The seal and cut may take place through flowable material. Impulse sealing is preferably employed in such a process, and sealing may occur through the flowable material.

The pouches manufactured using the film of the invention may range in size from generally 200 ml to 10 liters. The bags may range in size from 2 liters to over 300 gallons.

The major component of the film blend comprises about 70.5 wt % to about 98 wt % of one or more polymers selected from ethylene-alpha-olefin interpolymers and ethylene homopolymers, having a density between 0.915 g/cc and 0.935 g/cc and a melt index of less than 2 g/10 min. There are many examples of suitable polymers, which can be used as this component of the film blend. Suitable ethylene-alpha-olefin interpolymers can be polymerized using Zeigler-Natta catalysts. Companies such as Dow, Nova and Huntsman can produce suitable interpolymers commercially (tradenames Dowlex™ Sclair™ and Rexell™ respectively) using a solution phase process; ExxonMobil, ChevronPhillips and Nova can produce suitable interpolymers (tradenames NTX™, MarFlex™ LLDPE, Novapol™ LLDPE respectively) by a gas phase process; ChevronPhillips uses a slurry process (MarFlex™ LLDPE). Suitable ethylene-alpha-olefin interpolymers can also be polymerized using single site catalysts such as ExxonMobil's or ChevronPhillips' metallocene catalysts or Dow's constrained geometry catalysts (tradenames Exceed™, MarFlex mPACT™ and Elite™ respectively). Suitable low density ethylene homopolymers can be polymerized using the high pressure polymerization process. Commercial examples of such polymers are made by companies such as Nova, Dow, ExxonMobil, ChevronPhillips and Equistar. A Petrothene™ grade from Equistar is used in the present examples.

The minor component of the film blend comprises from about 2.0 to about 9.5 wt % of an ethylene $C_4$-$C_{10}$-alpha-olefin interpolymer having a density of less than 0.890 g/cc and a melt index of less than 5 g/10 min. This polymer is currently best produced in a single-site catalyst or metallocene catalyst polymerization process, but any other interpolymer may be selected for use that has similar characteristics suitable for the film to be produced, may be selected. Typical examples are ethylene-octene interpolymers marketed by Dow under the tradenames Engage™ and Affinity™, and by ExxonMobil under the tradename Exact™. ExxonMobil also manufactures suitable ethylene-hexene and ethylene-butene interpolymers, which are also marketed under the Exact™ tradename. Dow manufactures suitable ethylene-butene interpolymers under the tradename Flexomer™. Alternatives to any of these commercially available products would be selectable by a person skilled in the art for purposes of the invention.

The processing additives are generally referred to as "masterbatches" and comprise special formulations that can be obtained commercially for various processing purposes. In the present instance, the processing additives are selected from combinations of slip agents, anti-block agents, colorants and processing aids. In the present formulation, the amount of processing additives may range from 0 wt % to about 20 wt %. Typical masterbatches may comprise 1-5 weight % erucamide slip agent, 10-50 weight % silica anti-block, 1-5 weight % fluoropolymer process aid, and combinations of two and of three of these additives.

The sealant film of this invention may be used on its own as a monofilm for making bags and pouches. The monofilm produced may have a film thickness of from about 20 to about 125 microns. Preferably, the monofilm thickness may range from about 40 to about 80 microns. Alternatively, the monofilm may be incorporated into a multi-ply bag structure, where it functions as the sealant layer. Multi-layer films may be produced using the sealant film, generally having thicknesses in the range of from about 40 to about 150 um, or from about 40 to about 80 microns.

The films of the invention may be produced by any suitable method for producing polyethylene film. The monofilm can be made by a blown film process, but may also be made by a cast film process. Multi-layer films can be blown or cast extrusions, thermal laminates or adhesive laminates.

The adhesive used in the adhesive laminates may be an extruded adhesive, a solvent-based adhesive, a 100% solids adhesive or a water-based adhesive. Examples include the broad line of BYNEL™ coextrudable adhesives marketed by E.I. du Pont de Nemours. Non-polymeric materials can be included in the multi-layer and multi-ply film structures as layers such as, for example aluminum, aluminum oxide or silicon oxide.

Monolayer films are normally used for making pouches, which require moisture barrier but not high oxygen barrier. The inner plies of multi-ply bags, which are added to improve shipping and handling performance, are normally monofilms. Multi-layer films are used to make pouches or bags, which need a more sophisticated combination of properties, for example, higher barrier to oxygen. The outer ply of a multi-ply bag is often a multi-layer film. The middle ply may also be a multi-layer film, and is often of different composition than the outer ply. The sealant film of the invention may therefore be used as a single ply in such a structure or as part of a multi-layer film structure as described above.

In multi-layer polymeric film, the layers generally adhere to each other over the entire contact surface, either because the polymer layers inherently stick to each other or because an intermediate layer of a suitable adhesive is used. The layers in a multi-ply bag do not adhere to each other except at the edges of the bag in the heat seals.

Finally in another main aspect, the invention provides a multi-ply bag, used for packaging flowable material, which has an outer multi-layer film ply that has an inner sealant layer, an outer layer, or both layers are the monofilm as described above having a thickness of from about 2 to about 50 μm.

The filled pouches produced herein are manufactured in accordance with known packaging techniques. Usually they are made using vertical or horizontal form, fill and seal processes which are referred to by the acronyms VFFS and HFFS, respectively. The bags are pre-made and then usually filled through a fitment. They are often radiation sterilized in a batch process by the bag manufacturer. The packaging conditions may include those for aseptic packaging.

There is extensive description in the art of the types of polymers, interpolymers, copolymers, terpolymers, etc. that may be used in the film structures of the present invention. Examples of patents that describe such polymers include U.S. Pat. Nos. 4,503,102; 4,521,437; and 5,288,531. These patents describe films used to make pouches, which films may also be used to make bags. Other patents include CA 2,182,524 and CA 2,151,589. These patents describe pouch making using vertical form, fill and seal machines and processes. The disclosures of all of these patents are incorporated herein by reference.

The capacity of the pouches of the present invention may vary. Generally, the pouches may contain from about 20 milliliters to about 10 liters, preferably from about 10 milliliters to about 8 liters, and more preferably from about 1 liter to about 5 liters of flowable material.

The pouches of the present invention can also be printed by using techniques known in the art, e.g., use of corona treatment before printing.

A number of patents held by Dow in this area include CA 2,113,455; CA 2,165,340; CA 2,239,579; CA 2,231,449 and CA 2,280,910. All of these describe various polymer blends which are used to manufacture flexible packages such as those described herein. An example of a patent in this area is Exxon Mobil U.S. Pat. No. 5,206,075.

As will be understood by those skilled in the art, the multilayer film structure for the pouch of the present invention may contain various combinations of film layers as long as the sealant layer forms part of the ultimate film structure. The multilayer film structure for the pouch of the present invention may be a coextruded film, a coated film or a laminated film. The film structure also includes the sealant layer in combination with a barrier film such as polyester, nylon, EVOH, polyvinylidene dichloride (PVDC) such as SARAN™ (Trademark of The Dow Chemical Company), metallized films and thin metal foils. The end use for the pouch tends to dictate, in a large degree, the selection of the other material or materials used in combination with the seal layer film. The pouches described herein will refer to seal layers used at least on the inside of the pouch.

By flowable materials is meant materials which are flowable under gravity or which may be pumped. Normally such materials are not gaseous. Food products or ingredients in liquid, powder, paste, oils, granular or the like forms, of varying viscosity, are envisaged. Materials used in manufacturing and medicine are also considered to fall within such materials.

The VFFS and HFFS machines are well known in the art. The pouches are also well known. The film structure once made can be cut to a desired width for use on the machine. A pouch generally comprises a tubular shape having a longitudinal lap seal or fin seal with transverse end seal, such that, a "pillow-shaped" pouch is formed when the pouch is manufactured and contains flowable material.

BRIEF DESCRIPTION OF THE DRAWINGS

The following drawings are used to illustrate the invention and should not be used to construe the claims in a narrowing fashion.

DETAILED DESCRIPTION OF THE INVENTION

The following examples are used to illustrate the invention and should not be used to limit the scope of the claims. All parts and percentages are by weight unless otherwise specified.

Pouch Making

Figure 10:
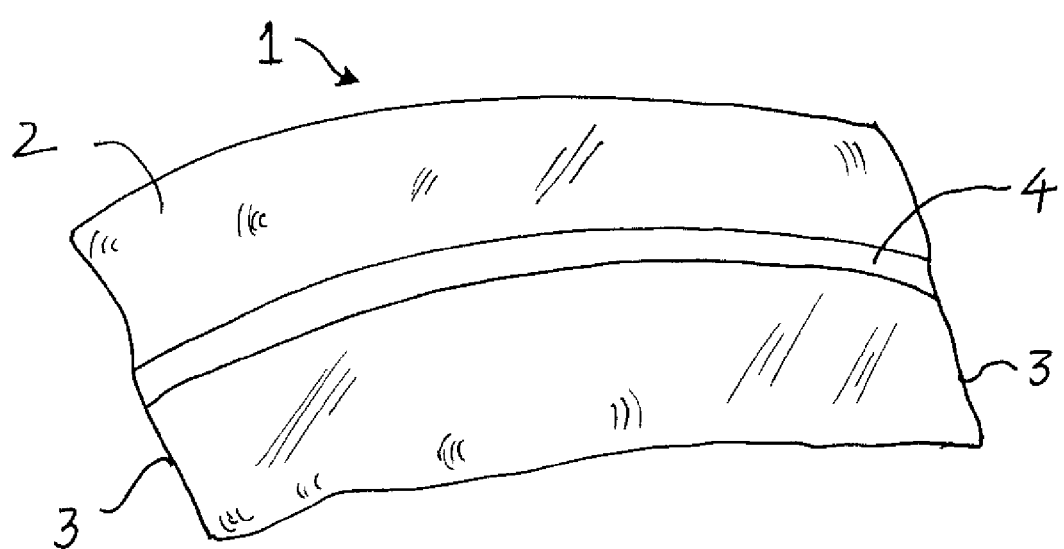
FIG. 10 illustrates a typical pillow-shaped pouch made using a film of the present invention.

In FIG. 10 of the present invention there is illustrated a typical pouch generally designated at 1, for containing liquids made using the film of the present invention. With regard to FIG. 10, there is shown a pouch 1 being a tubular member 2 having a longitudinal lap seal 4 and transverse seals 3 such that, a "pillow-shaped" pouch is formed when the pouch is filled with flowable material.

The pouch manufactured according to the present invention is preferably the pouch 1 shown in FIG. 10 made on so-called vertical form, fill and seal (VFFS) machines well known in the art. Examples of commercially available VFFS machines include those manufactured by Inpaco or Prepac. A VFFS machine is described in the following reference: F. C. Lewis, "Form-Fill-Seal," Packaging Encyclopedia, page 180, 1980, the disclosure of which is incorporated herein by reference.

In a vertical form, fill and seal (VFFS) packaging process, a sheet of the plastic film structure described herein is fed into a VFFS machine where the sheet is formed into a continuous tube in a tube-forming section. The tubular member is formed by sealing the longitudinal edges of the film together—either by lapping the plastic film and sealing the film using an inside/outside seal or by fin sealing the plastic film using an inside/inside seal. Next, a sealing bar seals the tube transversely at one end being the bottom of the "pouch", and then the fill material, for example milk, is added to the "pouch." The sealing bar then seals the top end of the pouch and either burns through the plastic film or cuts the film, thus, separating the formed completed pouch from the tube. The process of making a pouch with a VFFS machine is generally described in U.S. Pat. Nos. 4,503,102 and 4,521,437, the disclosures of which are both incorporated herein by reference.

Bag Making

Figure 11:
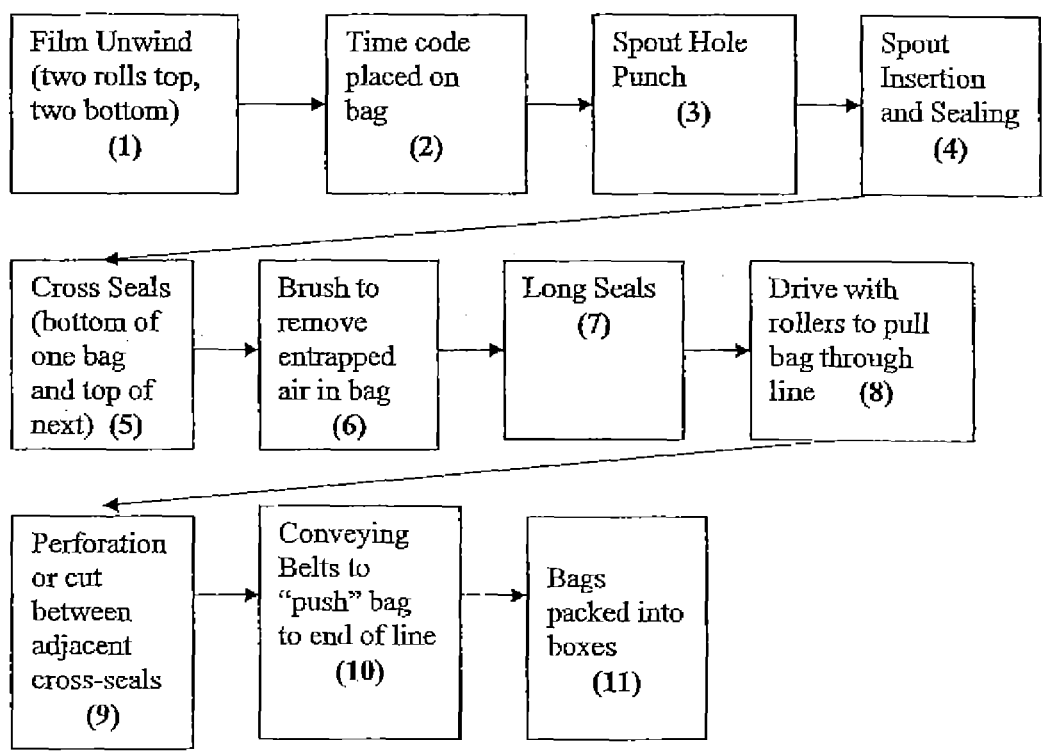
FIG. 11 illustrates a bag line flow diagram for making two-ply bags using the sealant film of the invention as a monolayer in such a bag structure.

Referring now to FIG. 11, of the accompanying drawings, bag-making is exemplified by a line to make two-ply bags with a spout. Four rolls of film of the same width are mounted on unwind stands (1). The two outermost rolls form the outer ply of the bag. These rolls are normally identical in film composition. The outer plies are usually the most complicated film layers in the bag structures. They are often laminates or coextrusions with a core layer of a barrier polymer such as nylon, polyester, or EVOH. Thin non-polymeric layers may also be included such as aluminum, aluminum oxide or silicon oxide, usually as coatings on the core layer of the laminate. The laminated core layer material is also often monaxially or biaxially oriented.

The two innermost rolls form the inner ply of the bag. They are normally identical in composition, and are most often monofilms or coextrusions of polyethylene.

A time code is applied to the outer surface of one of the outer plies at station (2). A hole is punched through the outer and inner plies that will form one side of the bag at station (3). At station (4), a spout, the form of which is selected from any of the standard forms known in the bag making art, is inserted through the hole, and an enlarged flange of the spout is normally heat sealed to the inner and outer film plies. At station (5), a pair of heat seals is applied across the width of the films, forming the bottom seal of one bag and the top seal of the next bag. A brush or other means for removing air trapped between the film plies is shown at station (6). The seals parallel to the length of the bag line are applied at either side of the films at station (7). Rollers, which pull the films through the bag line, are located at position (8).

At station (9), a knife or hot sealing bar may be used to completely separate the bags between the adjacent cross seals. Alternately, a sealing bar may be used to form a perforation between adjacent bags, so that they can be wound or folded up as a continuous roll. Station (10) is a conveyor belt to push the bag, or strip of bags, to the end of the bag-making line. At the final station (11), the bags are packed into boxes. Many variations of this procedure are known and the person skilled in the art would select from those processes as necessary for the proposed application.

The following procedures and test methods were used to develop the information set forth in the subsequent examples.

Gelbo Flex

This test method is valuable in determining the resistance of flexible packaging materials and films to flex-formed pinhole failures. This test method does not measure any abrasion component relating to flex failure. Physical holes completely through the structure are the only failures measured by the coloured turpentine portion of this test.

The Gelbo Flex tester is set up to test in accordance with ASTM F392. This apparatus consists essentially of a 3.5" (90 mm) diameter stationary mandrel and a 3.5" movable mandrel spaced at a distance of 7" (180 mm) apart from face-to-face at the start position (that is, maximum distance) of the stroke. The sides of the film sample are taped around the circular mandrels so that it forms a hollow cylinder between them. The motion of the moving mandrel is controlled by a grooved shaft to which it is attached. The shaft is designed to give a twisting motion of 440 degrees and, at the same time, move toward the fixed mandrel to crush the film so that the facing mandrels end up 1" apart at minimum distance. The motion of the machine is reciprocal with a full cycle consisting of the forward and return stroke. The machine operates at 45 cycles per minute.

By means of this tester, specimens of flexible materials are flexed at standard atmospheric conditions (23° C. and 50% relative humidity), unless otherwise specified. The number of flexing cycles can be varied depending on the flex crack resistance of the film structure being tested. A pinhole resistant film will develop very few pinholes (less than 10) when flexed for a large number of cycles (20,000).

The flexing action produced by this machine consists of a twisting motion, thus, repeatedly twisting and crushing the film. Flex crack failure is determined by measuring pinholes formed in the film. These pinholes are determined by painting one side of the tested film sample with coloured turpentine and allowing it to stain through the holes onto a white backing paper or blotter. Pinhole formation is the standard criterion presented for measuring failure, but other tests such as gas-transmission rates can be used in place of, or in addition to, the pinhole test. Obviously if a pinhole exists in the film, an oxygen molecule can pass directly through it without ever entering, diffusing through, and exiting the polymeric layers. But even when a hole does not exist, the flexed film structure may be damaged to an extent that alters its permeability to oxygen and other gases.

DSC (ASTM E794/E793)

Differential Scanning Calorimetry (DSC) determines the temperature and heat flow associated with material transitions as a function of time and temperature. The DSC cell is purged with nitrogen gas at a flow rate of 50 ml/minute. Heating and cooling rates are 10° C./min. For polyethylene film samples, the test starts at −50° C. and goes as high as 200° C. Each sample is melted, solidified and remelted. The test method allows for an initial equilibration at −50° C., and the temperature equivalent of five minutes of flat baseline prior to transitioning from heating to cooling, and vice versa. Data is analyzed with the measuring instruments' software. The first heating, cooling, and second heating cycles are plotted separately. The peak melting point values reported in the Tables come from the second heating cycle.

Tensile Modulus

Tensile Modulus of the polyethylene films is measured in accordance with ASTM Method D882, with two exceptions: a dumbbell specimen shape is used as defined in ASTM D638 and a crosshead speed of 500 mm/min is used, rather than 5 mm/min. The adjusted method correlates very well with the exact ASTM Method, which calls for a straight test sample and the slower crosshead speed. The values reported in the tables are the Tensile Modulus measured in the machine direction of the film.

The following Table 1 describes the resins used in the examples.

TABLE 1

RESINS USED IN THE EXAMPLES

| Supplier | Grade | Description | Melt Index (g/10 minutes @ 2.12 kg, 190° C.) | Density (g/cc) |
| --- | --- | --- | --- | --- |
| Dow | Elite ™ 5100G | ethylene-octene LLDPE (LLDPE-1) | 0.85 | 0.920 |
| Dow | Elite ™ 5110G | ethylene-octene LLDPE (LLDPE-2) | 0.85 | 0.926 |
| Equistar | Petrothene NA960-000 | ethylene homopolymer (HP-LDPE-1) | 1.00 | 0.920 |
| Dow | LD132I | ethylene homopolymer (HP-LDPE-2) | 0.22 | 0.921 |
| Chevron Phillips | mPACT ™ D449 | ethylene homopolymer MDPE | 0.8 | 0.942 |
| Nova | Sclair ™ 19C | ethylene homopolymer HDPE | 0.95 | 0.958 |
| Dow | Affinity ™ PL1880 | ethylene-octene ULDPE (ULDPE-C) | 1.0 | 0.902 |
| Dow | Engage ™ 8200 | ethylene-octene ULDPE (ULDPE-A) | 5.0 | 0.870 |
| Dow | Engage ™ 8180 | ethylene-octene ULDPE (ULDPE-B) | 0.5 | 0.863 |

Method for Blending Control Film Formulations and Making Films

Control film blends were made by blending the major resin component with 3.8 weight percent of additive masterbatches, so that the final film contained approximately 500 ppm erucamide slip agent, 2000 ppm silica antiblock and 600-850 ppm fluoropolymer process aid. The blends were blown into 51 µm thick monofilms on an extrusion line with a 150 mm diameter die at a blow-up ratio of 2.33:1 and throughput rate of about 47 kg/hour (0.10 kg/mm of die diameter).

TABLE 2

CONTROL FILMS

| Control Film Number | Major Resin Component |
| --- | --- |
| Control Film 1 | Elite ™ 5100G |
| Control Film 2 | Elite ™ 5110G |
| Control Film 3 | Petrothene ™ NA960-000 |
| Control Film 4 | Dow LD132I |
| Control Film 5 | mPACT ™ D449C |
| Control Film 6 | Sclair ™ 19C |

Method for Blending Film Formulations and Making Films of the Invention

Films to exemplify the invention were made by blending the same major component resins with minor amounts of ULDPE resins, which satisfy the extremely low density criterion. The same 3.8 weight percent of extrusion aid master batches was added to each blend, and the 51 µm thick films were blown on the same extrusion line as the control films under the same conditions.

TABLE 3

EXAMPLE FILMS

| Example Film Number | Major Component | Minor Component |
| --- | --- | --- |
| Example Film 1.3A | Elite ™ 5100G | 3 wt % Engage ™ 8200 |
| Example Film 1.6A | Elite ™ 5100G | 6 wt % Engage ™ 8200 |
| Example Film 1.9A | Elite ™ 5100G | 9 wt % Engage ™ 8200 |
| Example Film 1.9B | Elite ™ 5100G | 9 wt % Engage ™ 8180 |
| Example Film 2.1A | Elite ™ 5110G | 1 wt % Engage ™ 8200 |
| Example Film 2.3A | Elite ™ 5110G | 3 wt % Engage ™ 8200 |
| Example Film 2.6A | Elite ™ 5110G | 6 wt % Engage ™ 8200 |
| Example Film 2.9A | Elite ™ 5110G | 9 wt % Engage ™ 8200 |

TABLE 3-continued

EXAMPLE FILMS

| Example Film Number | Major Component | Minor Component |
|---|---|---|
| Example Film 3.9A | Petrothene ™ NA960-000 | 9 wt % Engage ™ 8200 |
| Example Film 4.9A | Dow LD132I | 9 wt % Engage ™ 8200 |

Counter Example Films

A counter example was made by blending Elite™ 5100G with a higher amount of Affinity™ PL1880, and 3.8 weight percent of extrusion aid masterbatches. Film was blown at a thickness of 51 μm on the same extrusion line as the control films under the same conditions. This blend is not one of the invention because the concentration of the ULDPE component is too high and the density of Affinity™ PL1880 (ULDPE-C) is too high.

Additional counter example films were also made by blending 9 weight percent Engage™ 8200 (ULDPE-A) and 3.8 weight percent of extrusion aid masterbatches into ChevronPhillips mPACTT™ D449, and into Nova Sclair™ 19C. These blends are not of the invention because the major polyethylene component is too high in the density.

TABLE 4

COUNTER EXAMPLE FILMS

| Counter Example Film Number | Major Component | Minor Component |
|---|---|---|
| Counter Example Film 1.30C | Elite ™ 5100G | 30 wt % Affinity ™ PL1880 |
| Counter Example Film 5.9A | mPACT ™ D449 | 9 wt % Engage ™ 8200 |
| Counter Example Film 6.9A | Sclair ™ 19C | 9 wt % Engage ™ 8200 |

EXAMPLE 1

The overall test results for the Control films are compared with those of the example films containing 9 weight % of a suitable extremely low density ULDPE resin. It can be seen in Table 5 that the example films consistently improved the pinhole resistance of a polyethylene film, while maintaining temperature resistance and stiffness.

TABLE 5

OVERALL SUMMARY OF RESULTS

| Sample | Average Number of Gelbo Flex Pinholes | | | DSC Peak Melting Point (° C.) | Machine Direction Tensile Modulus (psi) |
|---|---|---|---|---|---|
| | (10,0000 c) | (15,000 c) | (20,000 c) | | |
| Control Film 1 | 11.5 | 15.5 | 15 | 122.02 | 29737 |
| Example Film 1.9A | 5.0 | 5.5 | 5 | 121.42 | 23582 |
| Example Film 1.9B | 3.5 | 3.5 | 7.8 | 121.35 | 23261 |
| Counter Example Film 1.30D | 6.5 | 9.5 | 15 | 120.40 | 22401 |
| Control Film 2 | 45 | | 33 | 123.42 | 36679 |
| Example Film 2.9A | 25 | | 18 | 122.36 | 27964 |
| Control Film 3 | 45 | | | 109.13 | 23722 |
| Example Film 3.9A | 30 | | | 108.76 | 21588 |
| Control Film 4 | 34 | | | 108.56 | 26646 |
| Example Film 4.9A | 12.5 | | | 108.84 | 22304 |
| Control Film 5 | 50.5 | | | 130.80 | 83851 |
| Counter Example Film 5.9A | 44.5 | | | 130.04 | 61571 |
| Control Film 6 | 70.5 | | | 134.55 | 95855 |
| Counter Example Film 6.9A | 61.5 | | | 134.21 | 78064 |

EXAMPLE 2

These results indicate that the addition of less than 2 weight % of the extremely low density ULDPE component of the invention is ineffective in improving the flex crack resistance of the low density polyethylene film. Adding more than 9.5 wt % of the extremely low density ULDPE component has a significant deleterious effect on both the thermal resistance and stiffness of the low density polyethylene film. In addition, it becomes difficult to incorporate larger amounts of such an extremely low melting polymer into low density polyethylenes, of density 0.915-0.935 g/cc, using normal manufacturing equipment without experiencing premature melting of the pellets, which can result in extruder feedthroat bridging and other temperature-related problems.

Figure 1:
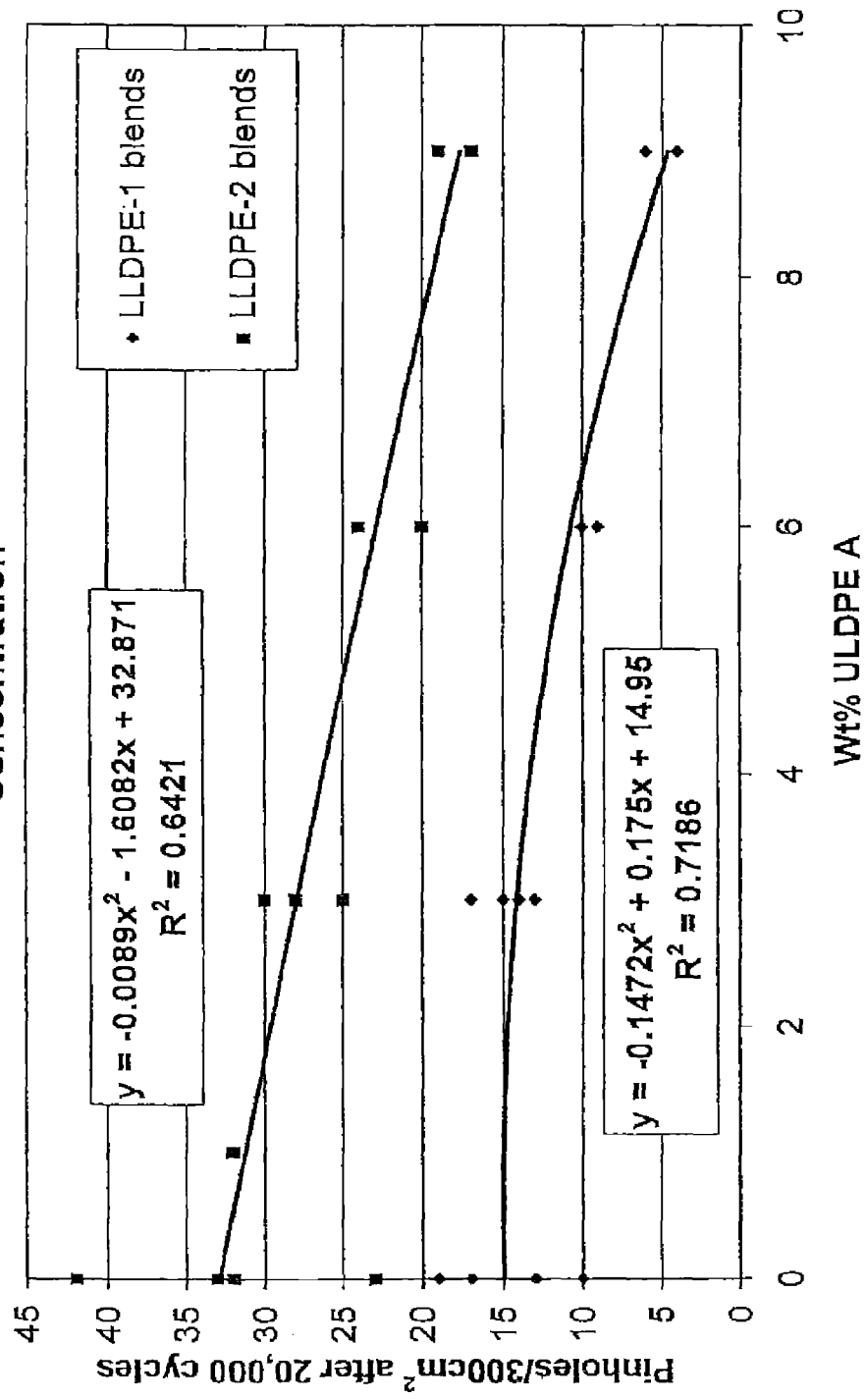
FIG. 1 graphically depicts the number of Gelbo flex pinholes which develop in 300 $cm^2$ of film after 20,000 Gelbo flexes vs. the wt % ULDPE-minor component. Thus the figure illustrates Gelbo flex improvement (fewer pinholes) as a function of ULDPE concentration.
Figure 2:
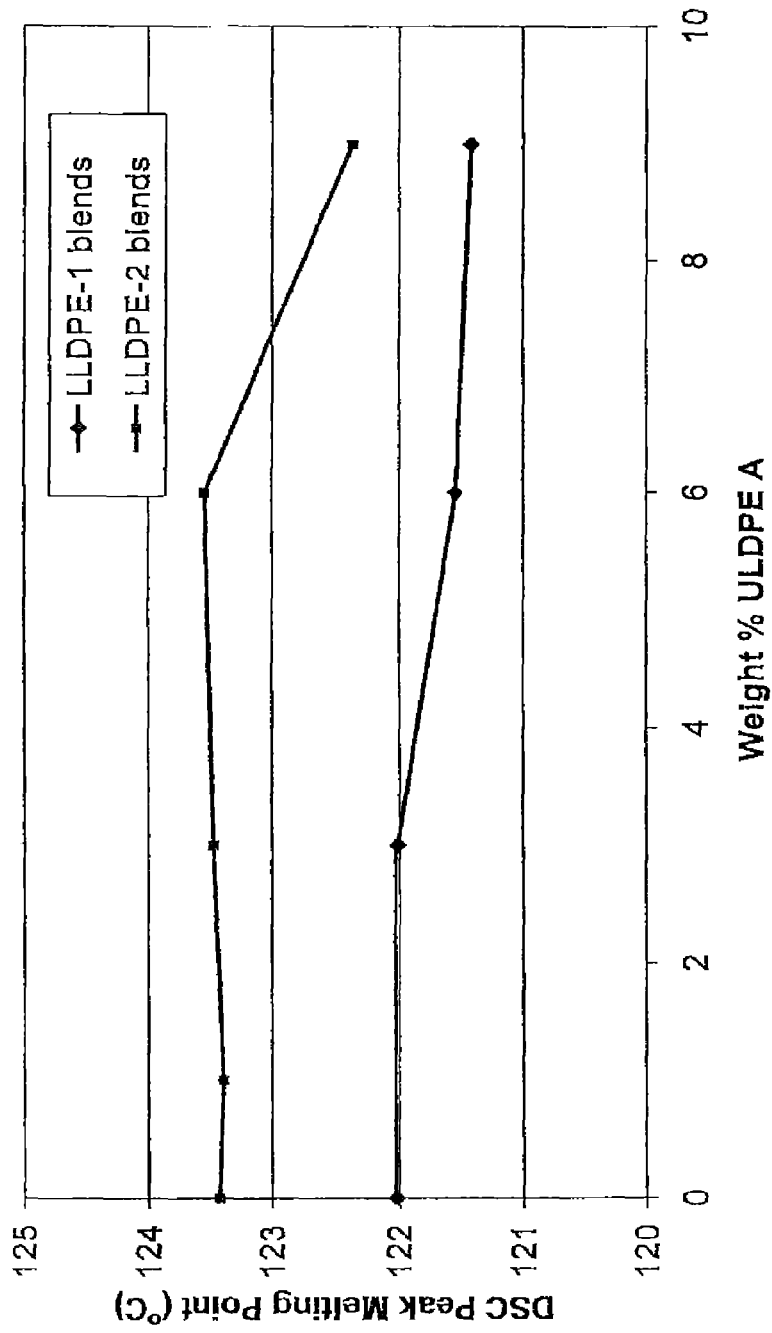
FIG. 2 graphically depicts a lowering of thermal resistance as a function of ULDPE concentration. The plot is of DSC peak melting point in (CC) values vs. wt % ULDPE-minor component values.
Figure 3:
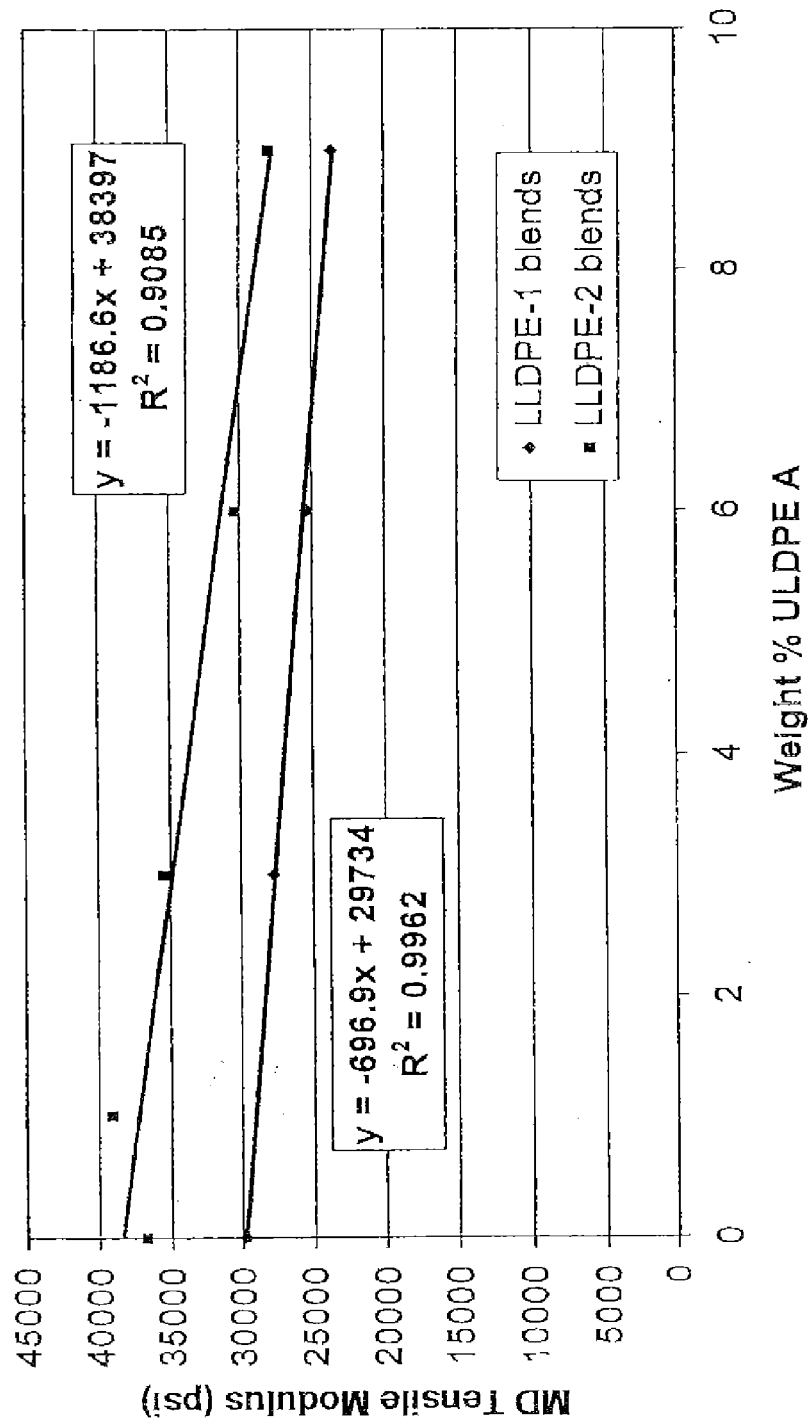
FIG. 3 graphically depicts representation of the loss of stiffness as a function of ULDPE concentration in a monofilm. The plot is MD tensile modulus (psi) vs. wt % ULDPE-minor component.

Table 6 and FIGS. 1 to 3 will be used to illustrate how the novel blending technique can be used to select the concentration of the extremely low density ULDPE component to measurably improve flex crack performance of a low density polyethylene film, while at the same time minimizing the negative effect on thermal resistance and stiffness. Consider a film made from LLDPE-1 (Elite™ 5100G). FIG. 1 shows that, on average, this film develops 15 pinholes/300 cm$^2$ after 20,000 cycles of Gelbo Flex testing. Addition of 6 weight % of ULDPE-A to the film recipe results in a film, which develops, on average, only 10 pinholes/300 cm$^2$ after 20,000 cycles. Referring to FIG. 2, it can be seen that the DSC peak melting point has dropped by less than half a degree Celsius. Thermal resistance is, therefore, well maintained. FIG. 3 shows that the machine direction Tensile Modulus of the film has decreased from 30,000 psi to 25,000 psi. However, a film with this stiffness should have good runnability on pouch and bag-making equipment.

Addition of 9 weight % ULDPE-A to the LLDPE-1 film recipe results in a film with even more impressive Flex crack resistance. Only 5 pinholes/300 cm² develop, on average, after 20,000 test cycles. Referring to FIGS. 2 and 3 respectively, it can be seen that DSC peak melting point drops by just over half a degree Celsius and that machine direction Tensile Modulus drops to about 23,000 psi. The negative impact on thermal resistance and stiffness is larger, but probably acceptable in most bag and pouch applications.

Film made from LLDPE-2 (Elite™ 5110G) has inferior pinhole resistance to film made from LLDPE-1. It develops, on average, 33 pinholes/300 cm² after 20,000 Gelbo Flex cycles (FIG. 1). Addition of only 3 weight % of ULDPE-A to the LLDPE-2 film recipe results in a film which develops, on average, only 28 pinholes/300 cm² after 20,000 test cycles (FIG. 1). This is a Flex Crack improvement of 15%. Referring to FIGS. 2 and 3, it can be seen that DSC peak melting point is unaffected by this recipe change and machine direction Tensile Modulus drops from 38,000 psi to 35,000 psi.

A larger addition of 6 weight % ULDPE-A to the same recipe improves Flex Crack resistance to, on average, 22 pinholes/300 cm² after 20,000 cycles, an improvement of 30%. Referring to FIGS. 2 and 3, it can be seen that DSC peak melting point is still unaffected by this recipe change and machine direction Tensile Modulus drops from 38,000 psi to 31,000 psi.

An even larger addition of 9 weight % ULDPE-A to the same recipe improves Flex Crack resistance, on average, to 18 pinholes/300 cm² after 20,000 cycles, an improvement of 45%. Referring to FIGS. 2 and 3, it can be seen that DSC peak melting point has dropped by about 1° C. and machine direction Tensile Modulus from 38,000 psi to 28,000 psi.

These blended films all have superior shipping and handling characteristics, as measured by Gelbo Flex performance, than the composed of LLDPE-2 alone. At the same time, they can be tailored to retain as much thermal resistance and stiffness as is required by the end-use.

TABLE 6

RESULTS FOR FILMS WHICH ARE BLENDS OF ULDPE-A WITH EITHER LLDPE-1 OR LLDPE-2

| Sample | wt % ULDPE-A | Average Number of Pinholes (20,000 cycles) | DSC Peak Melting Point (° C.) | Machine Direction Tensile Modulus (psi) |
|---|---|---|---|---|
| Control Film 1 | 0 | 15 | 122.02 | 29,737 |
| Example Film 1.3A | 3 | 15 | 122.01 | 27,758 |
| Example Film 1.6A | 6 | 10 | 121.55 | 25,316 |
| Example Film 1.9A | 9 | 5 | 121.42 | 23,582 |
| Control Film 2 | 0 | 33 | 123.42 | 36,679 |
| Example Film 2.1A | 1 | 32 | 123.39 | 39,096 |
| Example Film 2.3A | 3 | 28 | 123.47 | 35,377 |
| Example Film 2.6A | 6 | 22 | 123.54 | 30,324 |
| Example Film 2.9A | 9 | 18 | 122.36 | 27,964 |

EXAMPLE 3

This Example illustrates how the novel approach of the present invention of blending a minimal amount of ULDPE, which satisfies the extremely low density criterion, into a LLDPE improves flex crack resistance more effectively than the conventional approach of blending a larger amount of a higher density ULDPE into the same LLDPE. Comparison of Example Films 1.9A and 1.9B to Counter Example Film 1.30C in Table 5, shows that both example films result in measurably fewer Gelbo flex pinholes than the counter example film, when flexed for 10,000, 15,000 or 20,000 cycles.

Figure 4:
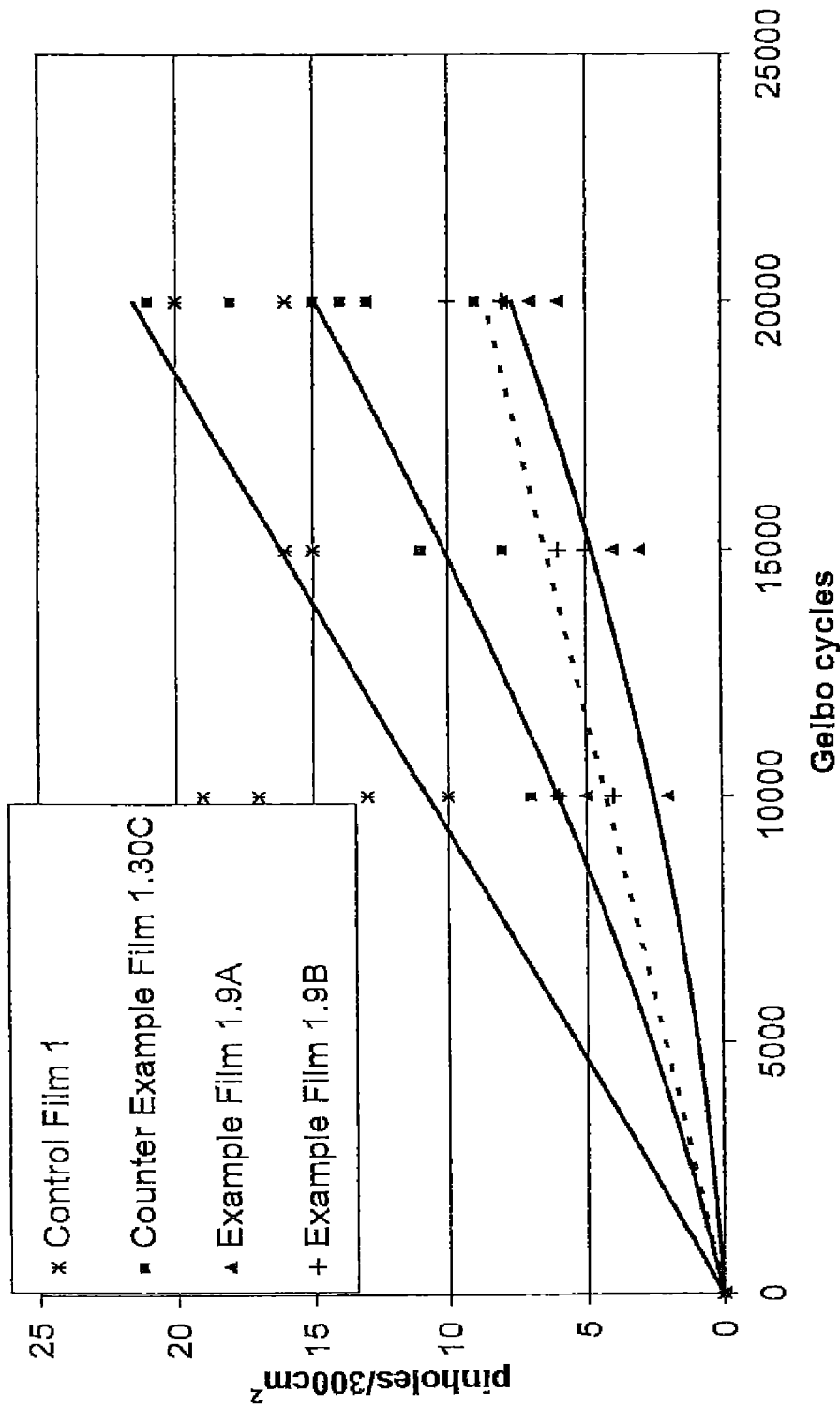
FIG. 4 is a graphical depiction showing that very low concentrations of extremely low density ULDPE's are more effective in improving the flex crack resistance of a LLDPE film than higher concentrations of a higher density ULDPE.

FIG. 4 is a visual depiction showing that very low concentrations of extremely low density ULDPEs are more effective in improving the flex crack resistance of a LLDPE film than higher concentrations of a higher density ULDPE.

The better flex crack resistance of films of the invention cannot simply be a molecular weight effect because ULDPE-A of the invention, Engage™ 8200, is actually higher in Melt Index, or lower in average molecular weight, than Affinity™ PL1880, the ULDPE-C of the Counter Example Film 1.30C.

Table 1 shows that blends of the invention also maintain thermal resistance and stiffness better than prior art ULDPE blends.

Figure 5:
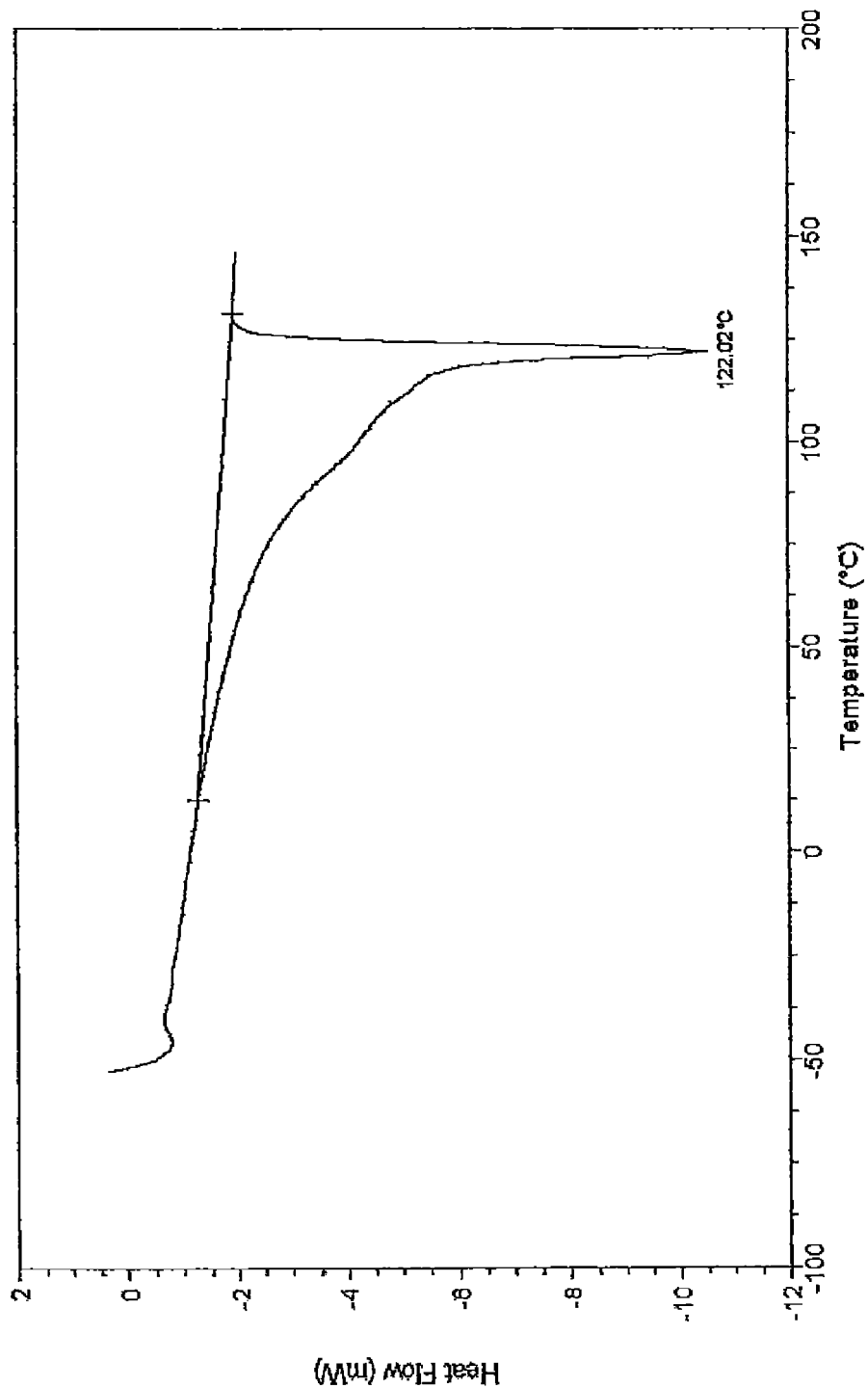
FIG. 5 graphically depicts a DSC melting curve for control film 1.

FIG. 5 is the DSC Melting curve for Control Film 1, made from Elite™ 5100G. The graph shows a melting peak at 122.02° C., and a shoulder to the lower temperature side. The shoulder indicates that a measurable portion of the Elite™ 5100G polymer melts at temperatures below 122° C.

Figure 6:
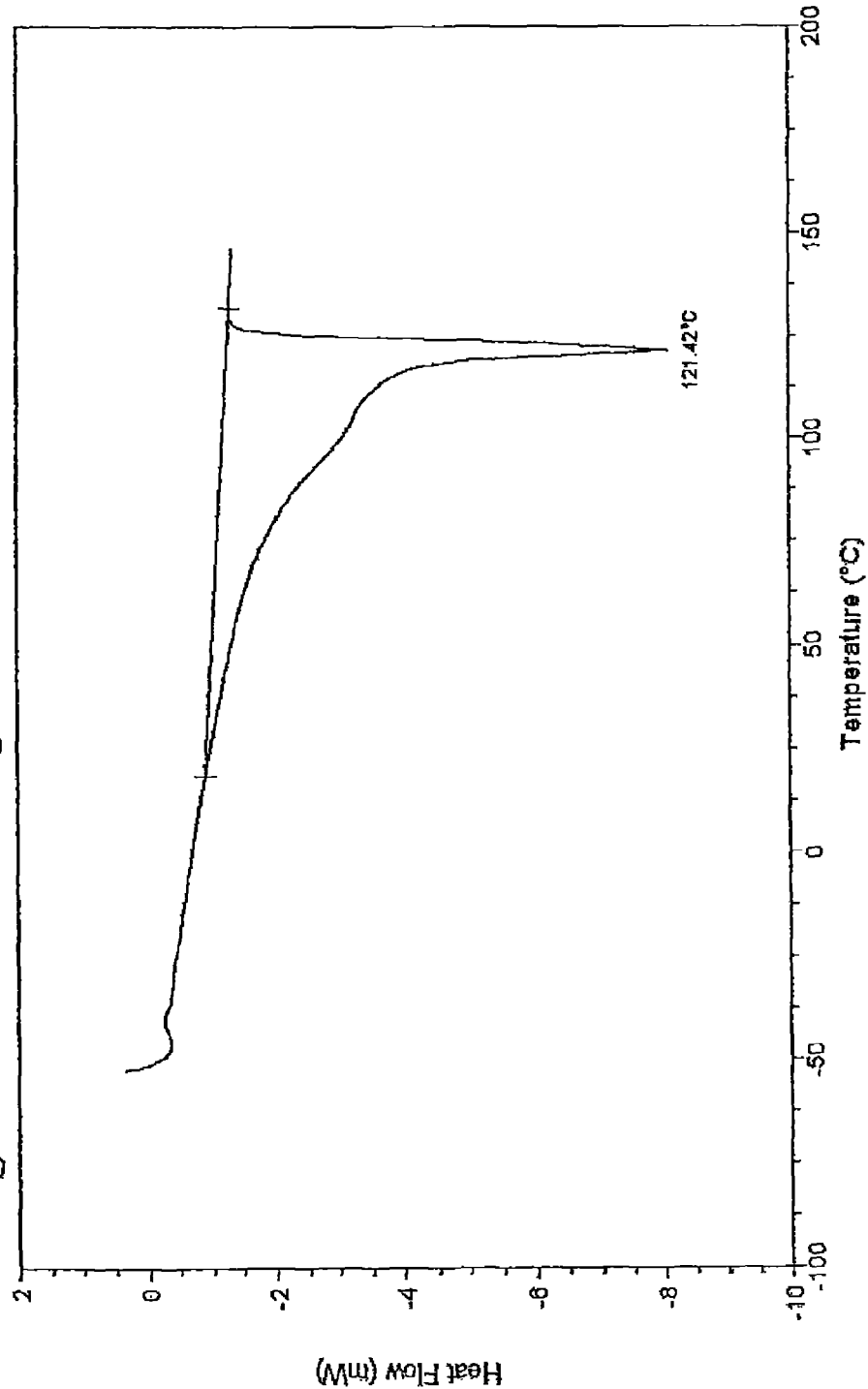
FIG. 6 graphically depicts a DSC melting curve for example film 1.9A.
Figure 7:
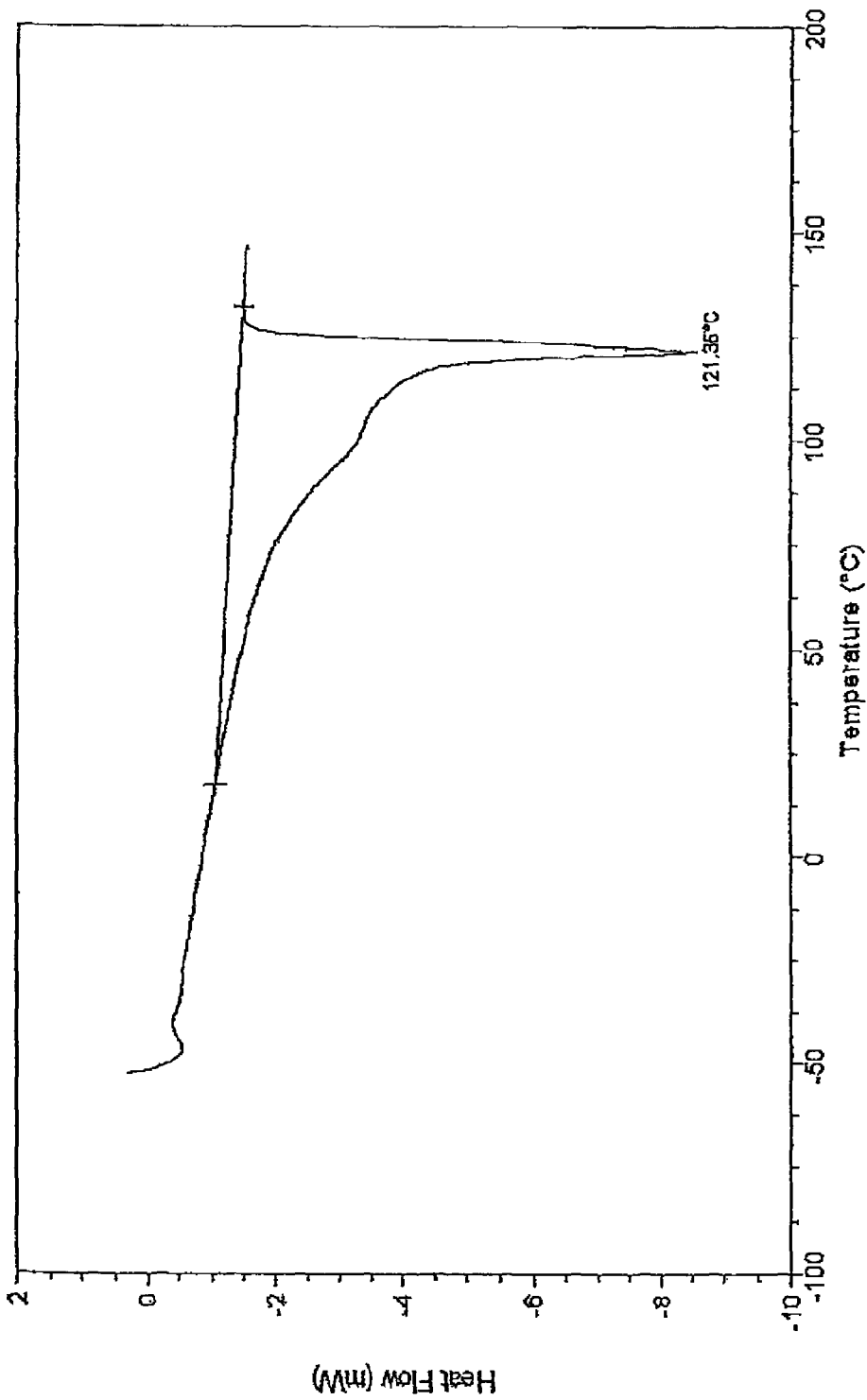
FIG. 7 graphically depicts a DSC melting curve for example film 1.9 B.

FIG. 6 is the DSC melting curve for Example Film 1.9A. It looks very much like that of Control Film 1 in FIG. 5. The peak melting point is 121.42° C., and the shoulder to the lower temperature side looks unchanged. Referring to FIG. 7, which is the DSC Melting Curve for Example Film 1.9B, it can be seen that the DSC curve for Example Film 1.9B also looks very similar to FIG. 5, with a melting peak of 121.35° C.

Figure 8:
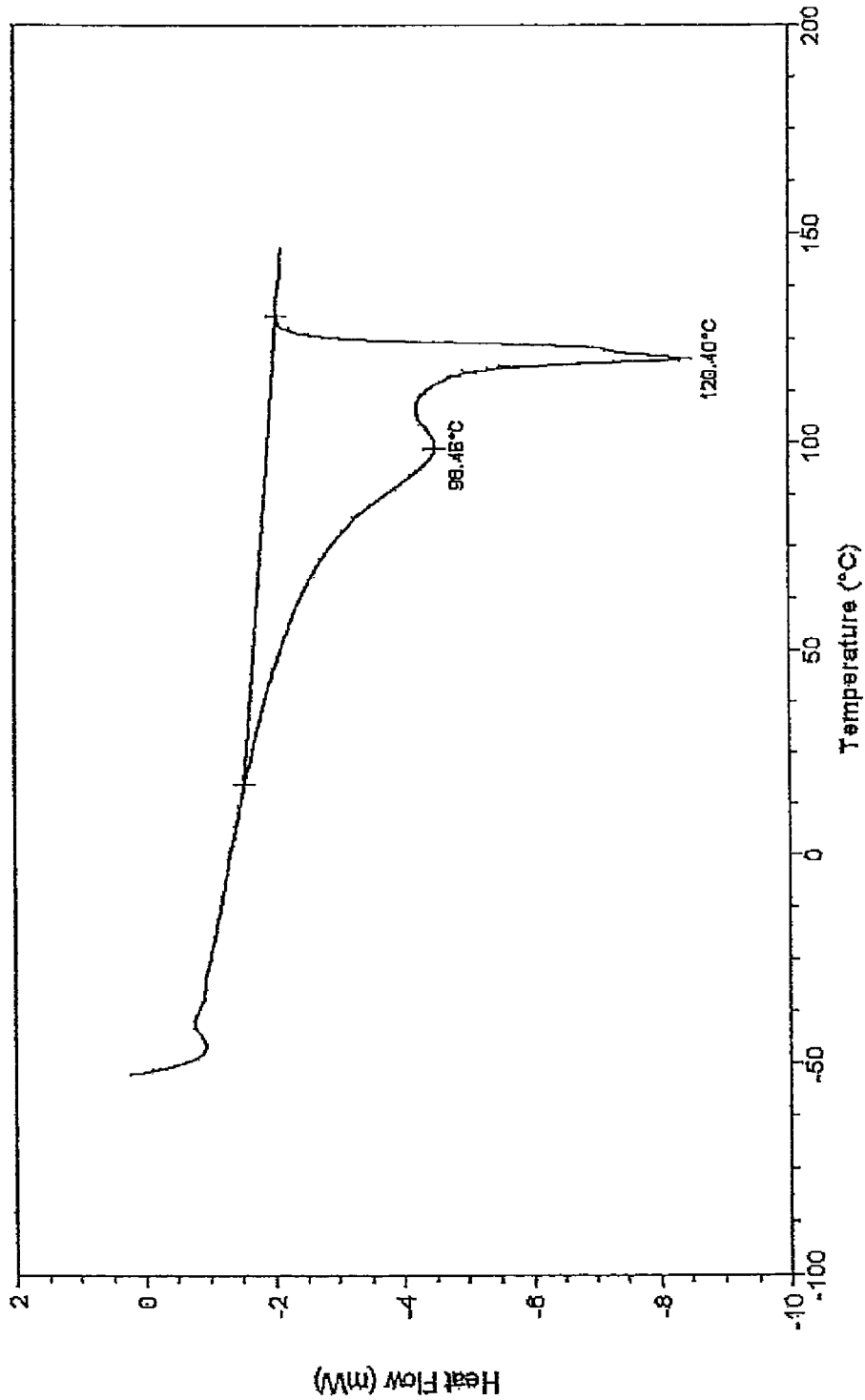
FIG. 8 graphically depicts a DSC melting curve for counter example film 1.30C.

In FIG. 8, it can be seen that the DSC Melting Curve for Counter Example Film 1.30C. By contrast, the DSC melting curve for Counter Example 1, 30D looks somewhat different. The melting peak is a degree lower at 120.40° C., and the shoulder to the lower temperature side of the curve has grown considerably. This film will have lower thermal resistance than the other three.

EXAMPLE 4

Figure 9:
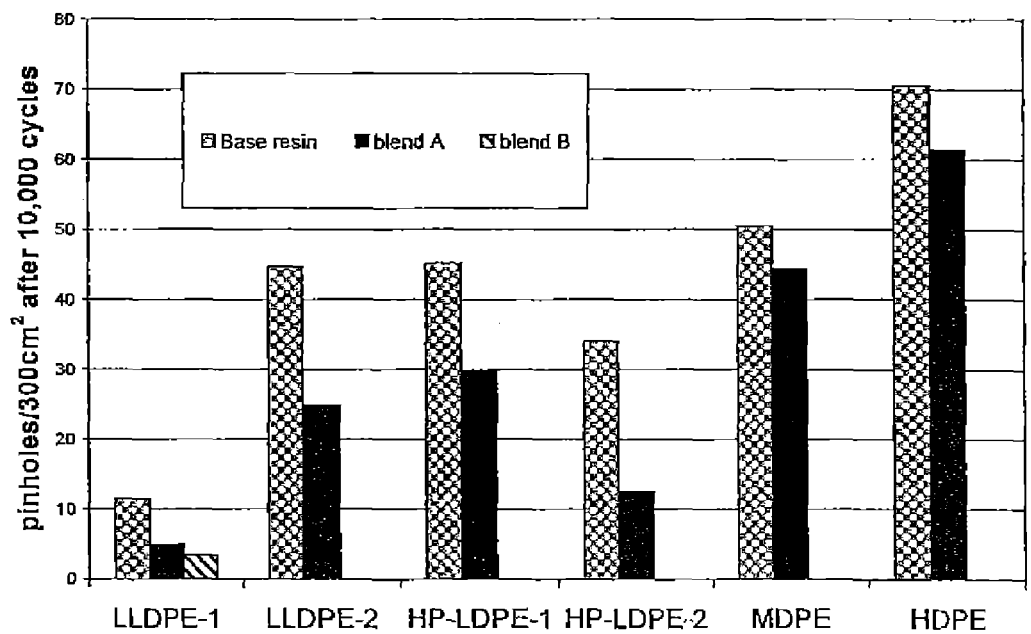
FIG. 9 is a bar graph representation illustrating improving the flex crack resistance of lower density polyethylene films vs. higher density films.

The inventive blending technique is not as effective for improving the flex crack resistance of medium density to high density polyethylenes. This can be observed in the data of Table 5, and is shown visually in FIG. 9. The number of pinholes/300 cm² in a low density polyethylene film can be cut in half, whereas the number of pinholes in a medium to high density film is reduced by less than 15%.

The invention may be varied in any number of ways as would be apparent to a person skilled in the art and all obvious equivalents and the like are meant to fall within the scope of this description and claims. The description is meant to serve as a guide to interpret the claims and not to limit them unnecessarily.

The invention claimed is:

1. A process for making a pouch, said process comprising the steps of:
   (I) providing a film structure comprising a sealant film;
   (II) forming said film structure into a tubular member;
   (III) heat-sealing the longitudinal edges of said tubular member;
   (IV) filling said tubular member with flowable material;
   (V) heat-sealing a first transverse end of said tubular member to form a pouch; and
   (VI) sealing and cutting through a second transverse end of said tubular member to provide a filled pouch;
   wherein said sealant film in Step (I) comprises:
   (a) from about 2.0 wt % to about 9.5 wt %, based on 100 wt % total composition, of an ethylene $C_4$-$C_{10}$-alpha-olefin interpolymer;

wherein said ethylene $C_4$-$C_{10}$-alpha-olefin interpolymer is present in an amount that optimizes flex crack resistance as measured using a Gelbo Flex tester set up to test in accordance with ASTM F392;

wherein said ethylene $C_4$-$C_{10}$-alpha-olefin interpolymer is present in an amount that minimizes reduction of thermal resistance, as measured using DSC (ASTM E794/E793) Differential Scanning Calorimetry (DSC), which determines temperature and heat flow associated with material transitions as a function of time and temperature;

wherein said ethylene $C_4$-$C_{10}$-alpha-olefin interpolymer is present in an amount that maximizes stiffness of said sealant film layer as measured using Tensile Modulus of said polyethylene films measured in accordance with ASTM Method D882; and wherein said ethylene $C_4$-$C_{10}$-alpha-olefin interpolymer is manufactured in a polymerization process using a single-site or metallocene catalyst and has a density of from 0.850 to 0.890 g/cc and a melt index of 0.3 to 5 g/10 min, (b) from about 70.5 wt % to about 98.0 wt %, based on too wt % total composition, of one or more polymers selected from ethylene homopolymers and ethylene $C_4$-$C_{10}$-alpha-olefin interpolymers, having a density between 0.915 g/cc and 0.935 g/cc and a melt index of 0.2 g/to min to 2 g/to min, and (c) from about 0 wt % to about 20.0 wt %, based on 100 wt % total composition, of processing additives selected from slip agents, antiblock agents, colorants and processing aids, and wherein said sealant film has a thickness of from about 2 μm to about 60 μm.

2. The process as recited in claim 1, wherein said film structure is a monofilm.

3. The process as recited in claim 1, wherein said film structure is a multi-layer film structure.

4. The process as recited in claim 3, wherein in said multi-layer film structure, one or both outer layers is a sealant layer.

5. The process as recited in claim 1, wherein said film structure is a multi-ply film structure comprising at least one intermediate or inner ply of said sealant film.

6. The process a recited in claim 1, wherein the sealing is performed by impulse sealing.

7. A process for making a pouch, said process comprising the steps of:
(I) providing a film structure comprising a sealant film;
(II) forming said film structure into a tubular member;
(III) heat-sealing the longitudinal edges of said tubular member;
(IV) filling said tubular member with flowable material;
(V) heat-sealing a first transverse end of said tubular member to form a pouch; and
(VI) sealing and cutting through a second transverse end of said tubular member to provide a filled pouch;
wherein said sealant film in Step (I) comprises:
(a) from about 2.0 wt % to about 9.5 wt %, based on 100 wt % total composition, of an ethylene $C_4$-$C_{10}$-alpha-olefin interpolymer;
wherein said ethylene $C_4$-$C_{10}$-alpha-olefin interpolymer is present in an amount such that the film structure develops 10 or less pinholes per 300 cm$^2$ in 20,000 cycles of Gelbo Flex testing, as measured using a Gelbo Flex tester set up to test in accordance with ASTM F392;

wherein said ethylene $C_4$-$C_{10}$-alpha-olefin interpolymer is present in an amount such that said film structure has a thermal resistance at temperatures just above 100° C., as measured using DSC (ASTM E794/E793) Differential Scanning Calorimetry (DSC), which determines temperature and heat flow associated with material transitions as a function of time and temperature;

wherein said ethylene $C_4$-$C_{10}$-alpha-olefin interpolymer is present in an amount such that the film structure has a minimum tensile modulus of 20,000 psi as measured using Tensile Modulus of the polyethylene films measured in accordance with ASTM Method D882;

wherein said ethylene $C_4$-$C_{10}$-alpha-olefin interpolymer is manufactured in a polymerization process using a single-site or metallocene catalyst and has a density of from 0.850 g/cc to 0.890 g/cc and a melt index of 0.3 g/10 min to 5 g/10 min, (b) from about 70.5 wt % to about 98.0 wt %, based on 100 wt % total composition, of one or more polymers selected from ethylene homopolymers and ethylene $C_4$-$C_{10}$-alpha-olefin interpolymers having a density between 0.915 ace and 0.935 g/cc and a melt index of 0.2 g/10 min to 2 g/10 min, and (c) from about 0 wt % to about 20.0 wt %, based on 100 wt % total composition, of processing additives selected from slip agents, antiblock agents, colorants, and processing aids, and wherein said sealant film has a thickness of from about 2 μm to about 60 μm.

8. The process as recited in claim 7, wherein said ethylene $C_4$-$C_{10}$-alpha-olefin interpolymer in (a) and (b) are each ethylene-octene interpolymers.

9. The process as recited in claim 7, wherein component (c) is present in an amount of from about 3 wt % to about 5 wt % based on 100 wt % total composition.

10. The process as recited in claim 7, wherein said film structure is a monofilm.

11. The process as recited in claim 7, wherein said film structure is a multi-layer film structure.

12. The process as recited in claim 11, wherein in said multi-layer film structure, one or both outer layers is a sealant layer.

13. The process as recited in claim 7, wherein said film structure is a multi-ply film structure comprising at least one intermediate or inner ply of said sealant film.

14. The process a recited in claim 7, wherein the sealing is performed by impulse sealing.

15. A process for making a pouch, said process comprising the steps of:
(I) providing a film structure comprising a sealant film;
(II) forming said film structure into a tubular member;
(III) heat-sealing the longitudinal edges of said tubular member;
(IV) filling said tubular member with flowable material;
(V) heat-sealing a first transverse end of said tubular member to form a pouch; and
(VI) sealing and cutting through a second transverse end of said tubular member to provide a filled pouch;
wherein said sealant film in Step (I) comprises:
(a) from about 2.0 wt % to about 9.5 wt %, based on 100 wt % total composition, of an ethylene $C_4$-$C_{10}$-alpha-olefin interpolymer;
wherein said ethylene $C_4$-$C_{10}$-alpha-olefin interpolymer is present in an amount that optimizes flex crack resistance as measured using a Gelbo Flex tester set up to test in accordance with ASTM F392;
wherein said ethylene $C_4$-$C_{10}$-alpha-olefin interpolymer is manufactured in a polymerization process using a single-site or metallocene catalyst and has a density of from 0.850 to 0.890 g/cc and a melt index of 0.3 to 5 g/10 min, (b) from about 70.5 wt % to about 98.0 wt %, based on 100 wt % total composition, of one or more polymers selected from ethylene homopolymers and ethylene $C_4$-$C_{10}$-alpha-olefin interpolymers, having a density between 0.915 g/cc and 0.935 g/cc and a melt index of 0.2 g/10 min to 2 g/10 min, and (c) from about 0 wt % to about 20.0 wt %, based on 100 wt % total composition, of processing additives selected from slip agents, antiblock agents, colorants and processing aids, and wherein said sealant film has a thickness of from about 2 μm to about 60 μm.

16. The process a recited in claim 15, wherein the sealing is performed by impulse sealing.

\* \* \* \* \*